(12) United States Patent
Büstgens et al.

(10) Patent No.: US 6,718,279 B2
(45) Date of Patent: Apr. 6, 2004

(54) VEHICLE STABILITY REGULATING SYSTEM

(75) Inventors: Burkhard Büstgens, Neuwied (DE); Harald Bestmann, Nassau (DE)

(73) Assignee: Lucas Varity GmbH (DE)

( * ) Notice: Subject to any disclaimer, the term of this patent is extended or adjusted under 35 U.S.C. 154(b) by 386 days.

(21) Appl. No.: 09/951,782

(22) Filed: Sep. 11, 2001

(65) Prior Publication Data

US 2002/0046003 A1 Apr. 18, 2002

Related U.S. Application Data

(63) Continuation of application No. PCT/EP00/02148, filed on Mar. 10, 2000.

(30) Foreign Application Priority Data

Mar. 11, 1999 (DE) .......................... 199 10 868

(51) Int. Cl.[7] .................... G01C 17/00; G01C 21/26; G05D 1/00; G06F 19/00
(52) U.S. Cl. ..................... 702/151; 701/1; 701/116; 701/205
(58) Field of Search .................... 702/151, 150, 702/130, 136, 35, 79, 145, 148, 189–90; 701/1, 37, 41, 116, 205, 213, 214, 215, 216

(56) References Cited

U.S. PATENT DOCUMENTS

| | | | |
|---|---|---|---|
| 5,274,576 A | 12/1993 | Williams | 364/565 |
| 5,510,989 A | 4/1996 | Zabler et al. | 364/424.05 |
| 5,719,790 A | 2/1998 | Lohrenz et al. | 364/571.03 |
| 5,826,204 A | 10/1998 | Ulm | 704/1 |
| 5,857,160 A * | 1/1999 | Dickinson et al. | 701/41 |

FOREIGN PATENT DOCUMENTS

EP  0 893 320 A2  1/1999

* cited by examiner

*Primary Examiner*—John Barlow
*Assistant Examiner*—Meagan S Walling
(74) *Attorney, Agent, or Firm*—MacMillan, Sobanski & Todd, LLC

(57) ABSTRACT

Vehicle stability regulating system for land vehicles, with a yaw rate sensor (GRS) which during operation delivers a first output signal (GR) representative of the yaw rate of the vehicle and a second output signal (Temp) representative of the operating or ambient temperature of the yaw rate sensor (GRS), and an additional sensor arrangement (SENS), which delivers a third output signal (0-GR) representing a non-yawing state of the vehicle, at least within a predetermined range of tolerance, wherein the first, the second and the third output signal are fed into an electronic control unit (ECU), and wherein the electronic control unit (ECU) comprises a computer unit (CPU) and at least one writable data memory (RAM) and a control program memory (ROM), which is connected to the computer unit, wherein a control program stored in the control program memory controls the computer unit so that in a learning mode the computer unit determines a temperature-related zero offset value from the first output signal in accordance with the second output signal and stores it in the data memory, and wherein in an operating mode the computer unit reads a temperature-related zero offset value out of the data memory, taking account of the third output signal or the second output signal, and relates it to the first output signal in order to generate an activating signal for intervening in the road behavior of the vehicle.

20 Claims, 2 Drawing Sheets

ವೆಹಿCLE STABILITY REGULATING SYSTEM
VEHICLE STABILITY REGULATING SYSTEM

This application is a continuation of PCT/EP00/02148, filed Mar. 10, 2000.

BACKGROUND OF INVENTION

This invention relates in general to a vehicle stability regulating system for land vehicles, and in particular to a vehicle stability regulating system with a yaw rate sensor which delivers a first output signal representative of the yaw rate of the vehicle during operation. Using yaw sensors of this kind, the yaw rate is determined as a measure of the dynamic behavior of the vehicle and used to generate an intervention signal via an electronic control unit.

Known arrangements entail the problem of the output signal of the rotational rate sensor exhibiting a very marked zero position drift due to temperature fluctuations, in particular during the warm-up phase. In order to prevent incorrect regulation procedures caused by the zero position drift, EP 0 893 320 A2 proposes a vehicle regulating device according to which, if the deviation between the yaw rate detected by means of the rotational rate sensor and a yaw rate estimated from the vehicle speed and the steering angle exceeds a threshold value, at least one wheel is braked in order to produce a yawing moment in the vehicle body so as to reduce the yaw rate deviation, with the vehicle regulating device temporarily raising the threshold value until the rotational rate sensor has warmed up.

One disadvantage of the vehicle regulating device which is known from EP 0 893 320 A2 lies in the fact that safety-critical running conditions cannot be entirely excluded, as automatic brake intervention is initiated to reduce the yaw rate deviation. A yaw rate, which is simply estimated, is also used here as initiating criterion for the automatic brake intervention, this inevitably not representing a particularly reliable quantity. Another disadvantage lies in the fact that the efficiency of the vehicle-regulating device is limited to a significant degree, as the threshold value is raised during the warm-up phase, so that the response behavior becomes more sluggish. A further factor is that temperature fluctuations occurring during operation are not taken into account where this known vehicle-regulating device is concerned.

DE 43 40 719 A1 discloses a circuit arrangement for evaluating the signals of a yaw rate sensor in which the temperature-dependence of the signals of the yaw rate sensor is compensated by using an additional temperature sensor. For this purpose the temperature of the yaw rate sensor is detected by the temperature sensor and a correction factor for the signals of the yaw rate sensor is determined and stored for each determined temperature. Since, on the one hand, the temperature sensor may have a temperature-dependent characteristic and, on the other, the connection between a determined temperature of the yaw rate sensor and the temperature-dependent variation of a corresponding signal of the yaw rate sensor may vary, it is impossible to guarantee reliable compensation of temperature-dependent variations of the signals of the yaw rate sensor. Moreover, this circuit arrangement requires an additional sensor, i.e. the temperature sensor.

SUMMARY OF INVENTION

This invention relates to a device and a method for compensating for the zero position drift of a rotational rate sensor, which has no adverse effects either on safety or efficiency.

The invention contemplates a device for regulating the stability of vehicles for land vehicles that includes an electronic control unit (ECU) for receiving a first, a second and a third output signal (GR, Temp, O-GR). The device also includes a yaw rate sensor (GRS) for delivering the first output signal (GR), which represents a yaw rate of the vehicle, with the second output signal (Temp), which is an output signal of the yaw rate sensor (GRS), representing the operating or ambient temperature of the yaw rate sensor. The device further includes a sensor arrangement (SENS) for delivering the third output signal (0-GR), which represents a non-yawing state of the vehicle. The electronic control unit operates in either a learning mode or an operating mode. In the learning mode, the electronic control unit determines a temperature-related zero offset value from the first output signal in accordance with the second output signal and stores it in a data memory (RAM) if the third output signal indicates a non-yawing state of the vehicle. In the operating mode, the electronic control unit reads a temperature-related zero offset value out of the data memory in accordance with the second output signal and corrects the first output signal with this zero offset value in order to generate a control signal for controlling the road behavior of the vehicle.

The invention also contemplates a method for regulating the stability of vehicles for land vehicles that includes delivering a first output signal. (GR) by means of a yaw rate sensor (GRS) which represents a yaw rate of the vehicle. The method also includes delivering a second output signal (Temp) by means of a yaw rate sensor (GRS) which represents an operating or ambient temperature of the yaw rate sensor. The method further includes delivering a third output signal (0-GR) by means of a sensor arrangement (SENS) which represents a non-yawing state of the vehicle. The first, the second and the third output signals are detected by means of an electronic control unit (ECU). The electronic control unit operates in either a learning mode or an operating mode. In the learning mode, a temperature-related zero offset value is determined from the first output signal in accordance with the second output signal and stored in a data memory (RM) if the third output signal indicates a non-yawing state of the vehicle. In the operating mode a temperature-related zero offset value is read from of the data memory, taking account of the second output signal, and the first output signal corrected with the zero offset value in order to generate a control signal for controlling the road behavior of the vehicle.

Various objects and advantages of this invention will become apparent to those skilled in the art from the following detailed description of the preferred embodiment, when read in light of the accompanying drawings.

DETAILED DESCRIPTION

The present invention is based on the recognition that yaw rate sensors deliver signals which are highly dependent on temperature. As the rotational rate sensors are usually housed in the passenger compartment or in the engine compartment of the vehicle, they are subject to particularly marked temperature fluctuations. These may be of the order of magnitude of 60° C. if, during periods when the vehicle is at a standstill, the rotational rate sensor assumes extremely low temperatures in winter or extremely high temperatures in summer which are increased or reduced, respectively, when the vehicle is operating by the heating or air conditioning system.

However it is also understood that the mode of the knowledge regarding the temperature which is acquired within the scope of the invention may also be used for other applications in the vehicle, for example for controlling the heating or air conditioning system. Applications of this kind are then easily possible if the oscillation frequency output signal of the rotational rate sensor can be accessed via a bus system, e.g. CAN bus.

Figure 1:
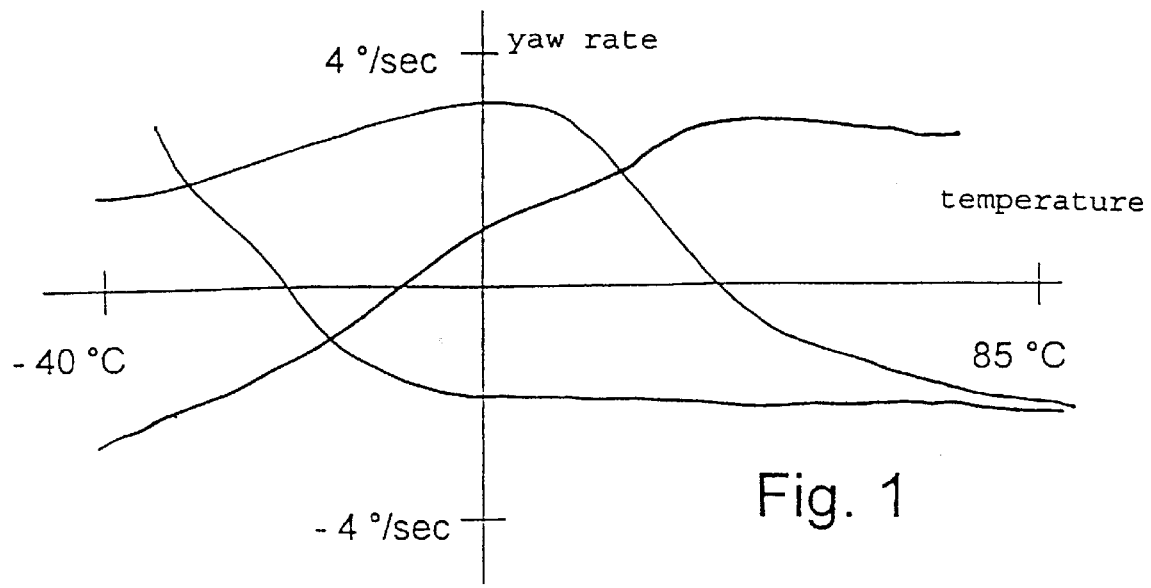
FIG. 1 is a schematic representation of curves of the zero offset values of three yaw rate sensors in accordance with the temperature.

The yaw rate sensor delivers a first output signal which reproduces an instantaneous yaw rate of the vehicle, corrupted by the operating or ambient temperature of the yaw rate sensor. The problem in this respect is that the temperature dependencies of the output signals may deviate considerably from one another, even for different yaw rate sensors of the same design and series, as shown in FIG. 1, so that fixed (programmed or hard-wired) logic for temperature compensation generally fails. It is, moreover, also impossible to compensate for fluctuations due to aging in this way.

Figure 2:
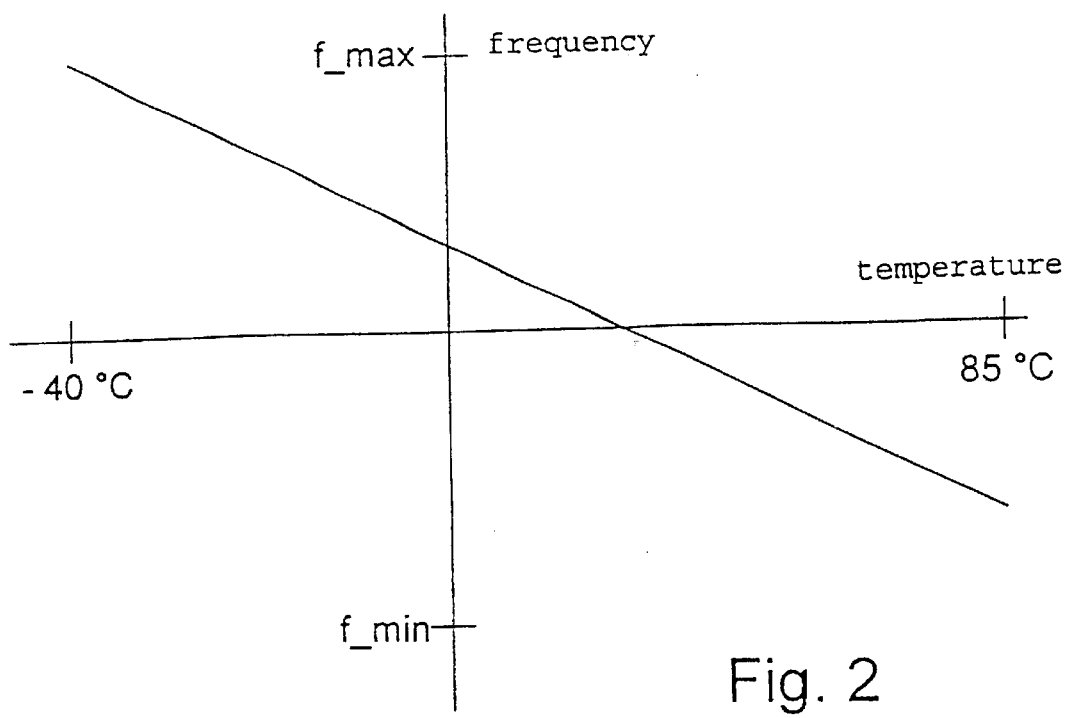
FIG. 2 is a schematic representation of the curve of the second output signal of the yaw rate sensor in accordance with the temperature.

The yaw rate sensor also delivers a second output signal, which is a (frequency or voltage) signal which would in fact be constant, although is likewise varied, preferably in linear fashion, (in fact solely) by the operating or ambient temperature according to a known regularity, as shown in FIG. 2.

Modern vehicles with ADS, ASR, etc. also comprise a number of sensors which deliver output signals which, although they could be used to determine the yaw rate (steering angle sensor, wheel speed sensors, etc.), are only suitable for a very rough estimation or determination of yaw rates deviating from zero.

However the output signals of sensors of this kind can be used with very good and reliable results in order to recognize that there is a zero or practically zero yaw rate (within a predetermined range of tolerance).

This knowledge is utilized by the invention. The control program for the computer unit distinguishes between a learning mode and an operating mode.

The regularity according to which the zero point of the yaw rate, detected by the yaw rate sensor, of the vehicle moves in accordance with the operating or ambient temperature is determined in learning mode. For this purpose, for different operating or ambient temperatures of the yaw rate sensor, as may be determined from the second output signal, the instantaneous yaw rate is determined when it can be inferred from the output signal of the additional sensor (for example the wheel speed sensors or the steering angle sensor or the fact that the automatic gear selector lever is in the "park" position) that the yaw rate of the vehicle is zero or practically zero.

The yaw rate deviating from zero which is thus determined (on the basis of the temperature influence) is entered as a zero offset value in a table, which is held as a so-called lookup table in the data memory, in accordance with the respective operating or ambient temperature of the yaw rate sensor. In this case the respective operating or ambient temperature of the yaw rate sensor serves as addressing criterion of the lookup table.

During operating mode the yaw rate of the vehicle which is detected by the yaw rate sensor is then corrected with a zero offset value which is read out of the table in accordance with the respective operating or ambient temperature of the yaw rate sensor (according to the second output signal). The value which is thus corrected serves as a basis for an activating signal for intervening in the road behavior of the vehicle, for example for selectively actuating one or more wheel brakes, limiting or reducing the throttle valve position, swinging out a support wheel or similar.

It is understood that the second output signal of the yaw rate sensor may also be generated by a separate temperature sensor mounted at or near the yaw rate sensor, should the actual yaw rate sensor not deliver the second output signal.

In a preferred embodiment the yaw rate sensor is formed by a micro-mechanical oscillation gyro, and/or the additional sensor arrangement by the wheel speed sensors for the ABS/ASR brake system, a steering lock angle sensor or similar, and/or the writable data memory by a non-volatile read-write memory.

In learning mode the actual zero offset value is checked as to plausibility before being entered into the data memory, preferably by determining a gradient of adjacent temperature-related zero offset values and comparing an actual zero offset value with the theoretical value resulting from the gradient trend.

It is also possible in learning mode to add zero offset values missing from the data stock by interpolating between zero offset values already determined.

It is further possible in learning mode to compensate for zero offsets due to aging by comparing a zero offset value already determined with an actual zero offset value for the same or practically the same temperature value and replacing the zero offset value already determined by an actual zero offset value in the data memory, if these deviate from one another.

In learning mode a first temperature-related zero offset value can be entered into the data memory at the final assembly stage with the vehicle at a standstill and a predetermined ambient temperature.

It is preferable in operating mode to correct the first output signal with a zero offset value which is read out of the data memory in accordance with the respective second output signal.

The second output signal is preferably the oscillation frequency of the yaw rate sensor, as the oscillation frequency of the yaw rate sensor (GRS) is correlated with the operating or ambient temperature of the yaw rate sensor (GRS). This enables the zero offset to be immediately and directly compensated.

Figure 3:
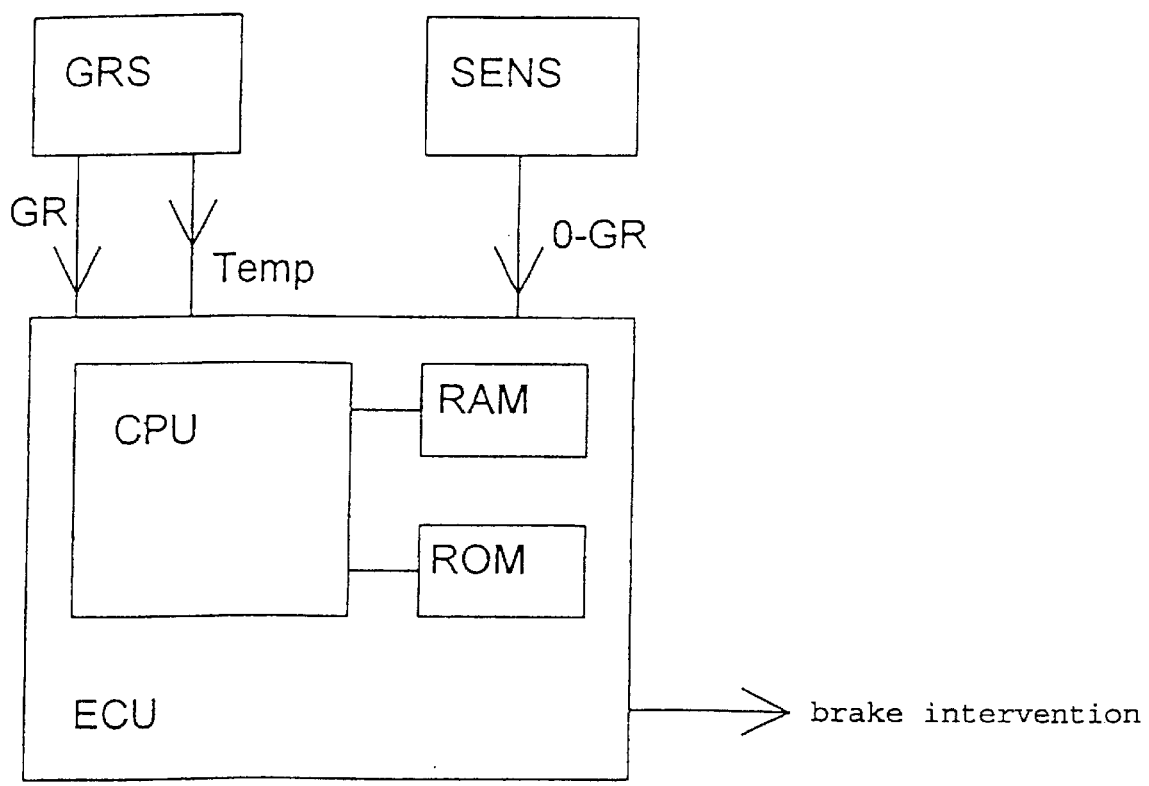
FIG. 3 is a schematic block diagram of a vehicle stability regulating system according to the invention.

FIG. 3 shows a vehicle stability regulating system for land vehicles, especially motor vehicles. The vehicle stability regulating system has an electronic control unit ECU, which comprises a computer unit CPU and at least one writable data memory RAM and a control program memory ROM, which is connected to the computer unit CPU. A yaw rate sensor GRS in the form of a micro-mechanical oscillation gyro is connected to the electronic control unit ECU, this gyro delivering during operation a first output signal GR representative of the yaw rate of the vehicle and a second output signal Temp representative of the operating or ambient temperature of the yaw rate sensor GRS. The two output signals GR and Temp are fed into the electronic control unit ECU, where they are processed by the computer unit CPU BY means of a program stored in the program memory ROM.

It is understood that the two memories RAM, ROM may also be nonvolatile, battery-backed flash RAMs or EEPROMS.

An output signal O-GR of an additional sensor arrangement SENS, which represent a non-yawing state of the vehicle, at least within a predetermined range of tolerance, is also fed into the electronic control unit ECU. This sensor arrangement SENS may be the wheel speed sensors for the ARS/ASR brake system, a steering lock angle sensor or similar for recognizing straight-ahead driving or vehicle standstill. It may be necessary to evaluate the signals delivered by the respective sensors through appropriate processing or an appropriate logic operation so that a definitive "non-yawing" state of the vehicle is reliably reproduced and recognizable.

The electronic control unit ECU generates as described in the following an activating signal for automatic brake intervention so as thus to influence the road behavior of the vehicle.

The control program for the computer unit CPU is divided into a learning mode and an operating mode.

In learning mode, if the additional sensor SENS has delivered the output signal O-GR, which indicates that the motor vehicle is not at the time turning about its vertical axis (yawing), the computer unit CPU calculates from the first output signal a temperature-related zero offset value in accordance with the second output signal Temp. The zero offset value, which is thus determined, is stored with the respective temperature value as address index in the data memory PAM. This procedure is then always repeated when the motor vehicle is not yawing and the yaw rate sensor is also subject to an operating or ambient temperature for which no zero offset value has yet been determined.

In learning mode the actual zero offset value is also checked as to plausibility before being entered into the data memory by determining a gradient of adjacent temperature-related zero offset values and comparing an actual zero offset value with the theoretical value resulting from the gradient trend.

If there is no zero offset value in the data memory for certain operating or ambient temperatures of the yaw rate sensor, it is possible to add zero offset values missing from the data stock by interpolating between zero offset values already determined.

Zero offsets due to aging are compensated by comparing a zero offset value already determined with an actual zero offset value for the same or practically the same temperature value and replacing the zero offset value already determined by an actual zero offset value in the data memory.

A first temperature-related zero offset value is entered into the data store at the final assembly stage with the vehicle at a standstill and a predetermined ambient temperature.

In operating mode the computer unit reads a temperature-related zero offset value out of the data memory, taking account of the second output signal, and subtracts this from the actual first output signal in order to generate a brake system activating signal for intervening in the road behavior of the vehicle.

The principle and mode of operation of this invention have been explained and illustrated in its preferred embodiment. However, it must be understood that this invention may be practiced otherwise than as specifically explained and illustrated without departing from its spirit or scope.

What is claimed is:

1. Device for regulating the stability of vehicles for land vehicles, comprising:
   an electronic control unit (ECU) for receiving a first, a second and a third output signal (GR, Temp, O-GR),
   a yaw rate sensor (GRS) for delivering the first output signal (GR), which represents a yaw rate of the vehicle, wherein the second output signal (Temp), which is an output signal of the yaw rate sensor (GRS), represents the operating or ambient temperature of the yaw rate sensor, and
   a sensor arrangement (SENS) for delivering the third output signal (0-GR), which represents a non-yawing state of the vehicle, wherein the electronic control unit
   in a learning mode determines a temperature-related zero offset value from the first output signal in accordance with the second output signal and stores it in a data memory (RAM) if the third output signal indicates a non-yawing state of the vehicle, and
   in an operating mode reads a temperature-related zero offset value out of the data memory in accordance with the second output signal and corrects the first output signal with this zero offset value in order to generate a control signal for controlling the road behavior of the vehicle.

2. Device according to claim 1 wherein the second output signal is a frequency signal of the yaw rate sensor varied by the operating or ambient temperature according to a known regularity.

3. Device according to claim 2 wherein the second output signal is the oscillation frequency of the yaw rate sensor which is correlated with the operating or ambient temperature of the yaw rate sensor.

4. Device according to claim 3 wherein the electronic control unit stores the determined zero offset value in the data memory if a comparison of the determined zero offset value with a theoretical zero offset value resulting from a gradient of adjacent temperature-related zero offset values stored in the data memory for checking the plausibility of the determined zero offset value has been successfully concluded.

5. Device according to claim 4 wherein the electronic control unit adds zero offset values missing from the data memory by interpolating between zero offset values already stored in the data memory.

6. Device according to claim 5 wherein the data memory contains a first temperature-related zero offset value which represents a zero offset value at the final assembly stage with the vehicle at a standstill and a predetermined operating and ambient temperature of the yaw rate sensor.

7. Device according to claim 1 wherein the electronic control unit stores the determined zero offset value in the data memory if a comparison of the determined zero offset value with a theoretical zero offset value resulting from a gradient of adjacent temperature-related zero offset values stored in the data memory for checking the plausibility of the determined zero offset value has been successfully concluded.

8. Device according to claim 1 wherein the electronic control unit adds zero offset values missing from the data memory by interpolating between zero offset values already stored in the data memory.

9. Device according to claim 1 wherein the data memory contains a first temperature-related zero offset value which represents a zero offset value at the final assembly stage with the vehicle at a standstill and a predetermined operating and ambient temperature of the yaw rate sensor.

10. Device according to claim 1 wherein the second output signal is a voltage signal of the yaw rate sensor varied by the operating or ambient temperature according to a known regularity.

11. Method for regulating the stability of vehicles for land vehicles, comprising the following steps:

delivering a first output signal, (GR) by means of a yaw rate sensor (GRS) which represents a yaw rate of the vehicle, delivering a second output signal (Temp) by means of a yaw rate sensor (GRS) which represents an operating or ambient temperature of the yaw rate sensor, delivering a third output signal (0-GR) by means of a sensor arrangement (SENS) which represents a non-yawing state of the vehicle, detecting the first, the second and the third output signal by means of an electronic control unit (ECU), in a learning mode determining a temperature-related zero offset value from the first output signal in accordance with the second output signal and storing the temperature-related zero offset value in a data memory (RM) if the third output signal indicates a non-yawing state of the vehicle, and in an operating mode reading a temperature-related zero offset value out of the data memory, taking account of the second output signal, and correcting the first output signal with the zero offset value which is read out in order to generate a control signal for controlling the road behavior of the vehicle.

12. Method according to claim 11 wherein the second output signal is a frequency signal of the yaw rate sensor varied by the operating or ambient temperature according to a known regularity.

13. Method according to claim 12 wherein the second output signal is delivered as the oscillation frequency of the yaw rate sensor, wherein the oscillation frequency is correlated with the operating or ambient temperature of the yaw rate sensor.

14. Method according to claim 13 wherein the storage of the determined zero offset value comprises the following steps:

determining a gradient of adjacent temperature-related zero offset values stored in the data memory, comparing the determined zero offset value with a theoretical zero offset value resulting from the determined gradient in order to check the plausibility of the determined zero offset value, and storing the determined zero offset value if the plausibility check has been successfully concluded.

15. Method according to claim 14 wherein the determination of temperature-related zero offset values in learning mode comprises the following steps:

interpolating between zero offset values stored in the data memory, and storing zero offset values missing from the data memory by interpolating determined zero offset values.

16. Method according to claim 15 wherein the determination of the zero offset-values in learning mode comprises the following steps:

determining a first temperature-related zero offset value at the final assembly stage with the vehicle at a standstill and a predetermined operating or ambient temperature of the yaw rate sensor, and storing the first temperature-related zero offset value in the data memory.

17. Method according to claim 11 wherein the storage of the determined zero offset value comprises the following steps:

determining a gradient of adjacent temperature-related zero offset values stored in the data memory, comparing the determined zero offset value with a theoretical zero offset value resulting from the determined gradient in order to check the plausibility of the determined zero offset value, and storing the determined zero offset value if the plausibility check has been successfully concluded.

18. Method according to claim 11 wherein the determination of temperature-related zero offset values in learning mode comprises the following steps:

interpolating between zero offset values stored in the data memory, and storing zero offset values missing from the data memory by interpolating determined zero offset values.

19. Method according to claim 11 wherein the determination of the zero offset-values in learning mode comprises the following steps:

determining a first temperature-related zero offset value at the final assembly stage with the vehicle at a standstill and a predetermined operating or ambient temperature of the yaw rate sensor, and storing the first temperature-related zero offset value in the data memory.

20. Method according to claim 11 wherein the second output signal is a voltage signal of the yaw rate sensor varied by the operating or ambient temperature according to a known regularity.

* * * * *